UNITED STATES PATENT OFFICE.

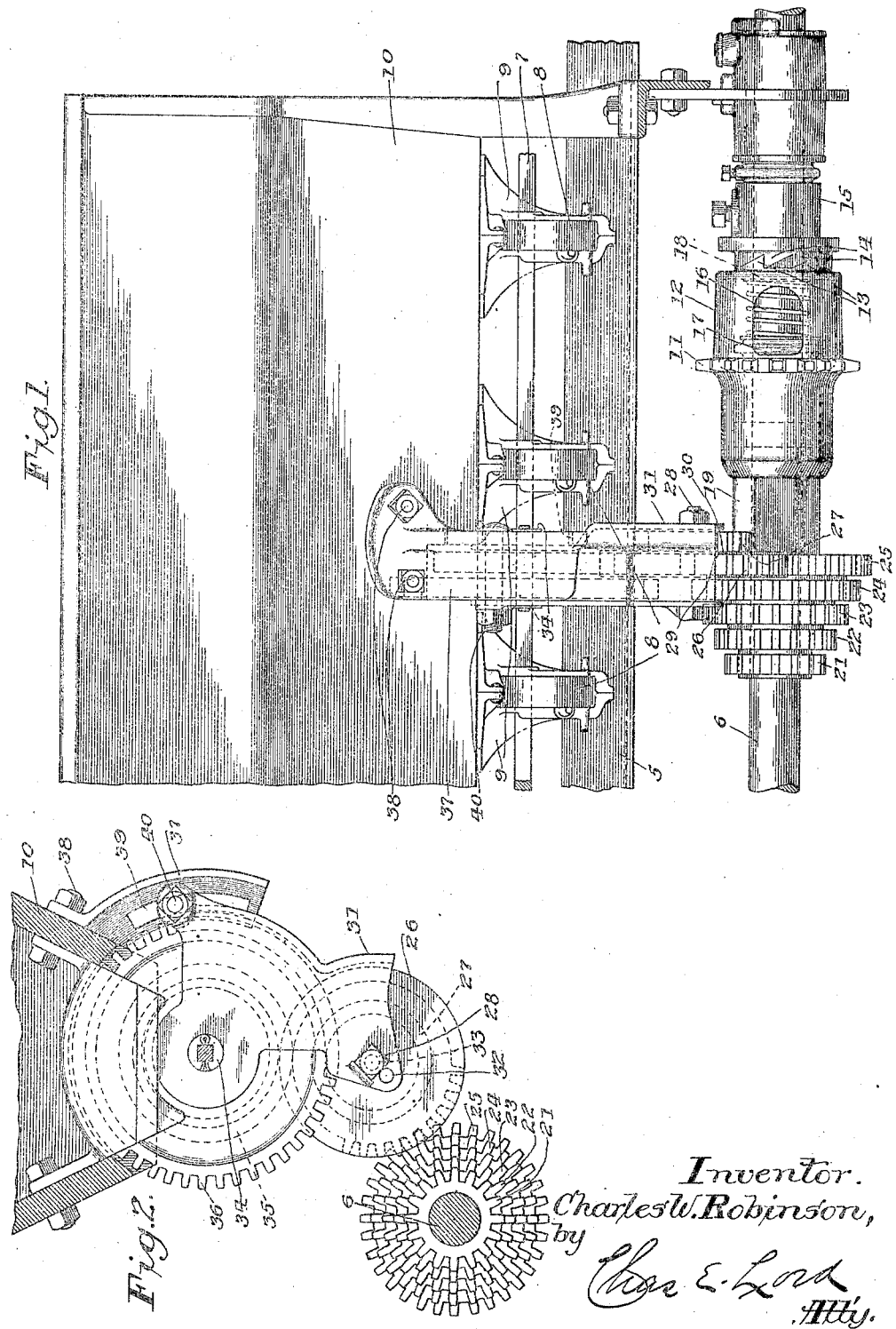

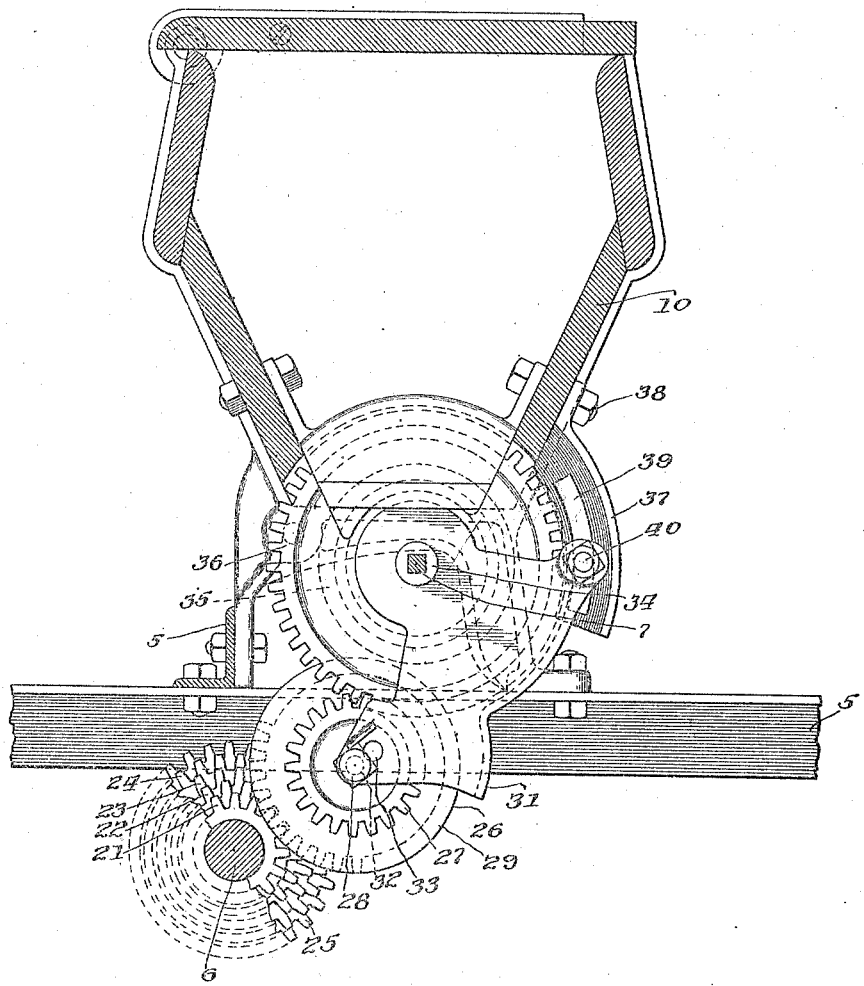

CHARLES W. ROBINSON, OF HAMILTON, ONTARIO, CANADA, ASSIGNOR TO INTERNATIONAL HARVESTER COMPANY OF CANADA, LIMITED.

DRIVING MECHANISM.

1,291,153.  Specification of Letters Patent.  Patented Jan. 14, 1919.

Application filed January 19, 1917. Serial No. 143,296.

*To all whom it may concern:*

Be it known that I, CHARLES W. ROBINSON, a citizen of the United States, residing at Hamilton, in the county of Wentworth, Province of Ontario, Dominion of Canada, have invented certain new and useful Improvements in Driving Mechanism, of which the following is a full, clear, and exact specification.

My invention relates to driving mechanism, and has for its object to provide an improved drive especially adapted to grain drills whereby a wide variety of speed changes is obtainable. The mechanism employed is simple, rugged, and compact, and the speed changes may be made easily and expeditiously.

In the accompanying drawings I have, for purposes of illustration, shown one embodiment of my invention, and in these drawings—

Figure 1 is a rear view of a portion of a grain drill showing my improved driving mechanism secured thereto in operative position;

Fig. 2 is an end view of the same showing a portion of the drill in section, the gearing being shown in its adjustment for high speed driving; and Fig. 3 is a view similar to Fig. 2 but with the gearing shown adjusted for driving at the lowest speed obtainable.

In the embodiment of my invention shown, a grain drill of standard construction is illustrated, having the usual frame 5, main drive shaft 6 supported by suitable bearings on the main frame, feed shaft 7, and feed runs 8 supported by brackets 9 secured to the bottom of the grain box 10. It will be understood that in drilling grain the amount of grain planted per unit of length of a row is determined by the speed of the feed shaft; therefore in carrying out my invention I provide an improved, adjustable, speed varying, driving connection between the main drive shaft 6 and the feed shaft 7. As shown, the shaft 6 is driven by means of the sprocket 11, which is connected by a suitable chain to the main axle carried by the tractor wheels of the drill. The sprocket 11 is formed integral with a sleeve 12 loosely mounted on the shaft 6, and the sleeve is provided with ratchet teeth 13 which mesh with corresponding ratchet teeth 14 formed on a collar 15 secured to shaft 6. The teeth 13 are normally forced into engagement with the teeth 14 by a spring 16 mounted on shaft 6 within the sleeve 12, and one end of this spring abuts against a fixed collar 17 secured to the shaft 6, and the other end of the spring abuts against the end wall 18 of the sleeve. The opposite end of the sleeve 12 is provided on its inner wall with hexagonal bearing surfaces, and slidable within the sleeve is a sleeve member 19 loosely mounted on the shaft 6 and provided with similar and coacting surfaces on its outer face. Secured to the sleeve 19 is a compound cone gear made up of spaced apart spur gears 21, 22, 23, 24 and 25. Each of these gears is adapted to be connected with gearing on the feed shaft 7 in a manner to be hereinafter described. Idler gears 26 and 27 are secured to a suitable sleeve loosely mounted on a bolt 28, which is secured to the lower end of an idler swinging bracket 31, two sets of registering apertures 32 and 33 being provided in the side walls of said bracket for purposes to be hereinafter described. It will be noted that the gears 26 and 27 are located between the side walls of the bracket and secured in place by a bolt 28, and that the gear 26 is provided with flanges 29 and 30 which secure the gear against lateral displacement when the same is in mesh with one of the gears 21 to 25. The bracket 31 is loosely mounted on suitable cylindrical bearing members 34 mounted on shaft 7 and having angular axial openings. The gears 35 and 36 are secured to the shaft 7 between the walls of bracket 31 and are adapted to mesh respectively with gears 26 and 27 in different positions of adjustment of the driving mechanism.

A stationary bracket 37 is secured to the grain box 10 by suitable securing means 38 and is provided with an arcuate slot 39, the curvature of which conforms to an arc drawn with shaft 7 as a center. The fixed bracket 37 is angular in cross section and the side wall and outer wall overlap and receive the upper outer portion of swinging bracket 31, which is secured to bracket 37 in its different positions of adjustment by a bolt 40, which passes through suitable registering apertures in bracket 31 and through the slot 38 in the bracket 37.

The operation of the device is as follows: As shown in Fig. 3, the mechanism is adjusted to give the slowest obtainable speed for the feed shaft 7 and, as will be clear from an inspection of said figure, said shaft is driven in the following manner: The sprocket 11 is driven from a suitable source of power and through the coöperating hexagonal bearing surfaces on the sleeves 12 and 19 the compound cone gear 21—25 is rotated. As shown in Fig. 3, the idler gear 26 mounted on the bolt 28 is in mesh with the smallest of the cone gears, 21, and the spur gear 27 fixed to the gear 26 and also mounted on the bolt 28 meshes with the spur gear 36 mounted on shaft 1, thereby rotating the shaft 7. Should it be desired to obtain a higher driving speed for the shaft 7, the bolt 40 in the slot 38 of bracket 37 is loosened and the swinging bracket 31 is swung about the bearing members 34 on shaft 7 away from the compound cone gear 21, 25. This will allow the cone gear to be adjusted longitudinally on the shaft until the desired gear is in mesh with the gear 26. When this adjustment has been made the remaining portion of the drive will be effected as when the gears 21 and 26 were in mesh.

As will be seen, this will give five different speeds, termed, for convenience, the five slow speeds. When it is desired to obtain a faster speed than can be obtained by means of the adjustment above described, the bolt 28 is loosened and the position of the gears 26 and 27 on this bolt 28 is reversed, the bolt being transferred to the inner registering apertures 33 at the lower end of the bracket 31. When this change has been made the gear 26 may be adjusted as before in mesh with any one of the spur gears 21 to 25 and the shaft 7 will be driven through the following gears named in the order of their operation: As shown in Fig. 2, assuming that the compound cone gear is being driven, the drive of shaft 7 will be accomplished through the gears 25, 26 and 35. From an inspection of the relative sizes of the gearing, it will be obvious that the shaft 7 will be driven at a much higher speed than was obtained through the adjustment shown in Fig. 3. With the gears 26, 27 and bolt 28 positioned as shown in Fig. 2, the bracket 31 may be swung about its pivot and the gear 26 may be adjusted to mesh with any one of the gears 21 to 25, and thus five speeds will again be obtained, the speeds in this case being termed, for convenience, the five fast speeds.

It will thus be seen that I can obtain ten different speeds by means of the simple adjustments above described, and that the device is compact and self-contained, all of the various gears being carried on the machine ready for use when desired.

While I have in this application specifically described one embodiment which my invention may assume in practice, it is to be understood that the form shown is used for purposes of illustration and that the invention may assume other forms and the construction shown be modified without departing from the spirit of the invention.

What I claim as new is:

1. In a grain drill, a drive shaft, a feed shaft, and variable speed driving connections between said drive shaft and said feed shaft including a series of cone gears mounted on said drive shaft and relatively fixed with respect to each other, gears on said feed shaft, and means including a plurality of relatively fixed speed changing idler gears connecting said cone gears with the gears on said feed shaft.

2. In a grain drill, a drive shaft, a feed shaft, and variable speed driving connections between said drive shaft and said feed shaft including a series of spaced apart cone gears mounted on said drive shaft and relatively fixed with respect to each other, gears on said feed shaft, and means including a flanged idler gear for connecting said spaced apart cone gears with the gears on said feed shaft.

3. In a grain drill, a drive shaft, a plurality of gears carried thereby, a driven shaft, a plurality of gears secured thereto, and means for operatively connecting said drive shaft with said driven shaft including a bracket pivoted on said driven shaft, and idler gears adjustably carried by said bracket.

4. In a grain drill, a frame, a drive shaft journaled thereon, a driven shaft journaled thereon, a sleeve slidably carried by said drive shaft, a series of spaced apart cone gears secured to said sleeve, and means including a flanged idler gear for connecting any one of said cone gears to said driven shaft.

5. In a grain drill, a frame, a drive shaft journaled thereon, a driven shaft journaled thereon, a sleeve slidably carried by said drive shaft, a series of relatively fixed cone gears secured to said sleeve, means for connecting any one of said cone gears to said driven shaft and means carried by said connecting means for preventing lateral displacement between said connecting means and said cone gears when they are in operative position with respect to each other.

6. In a grain drill, a frame, a drive shaft journaled thereon, a sleeve loosely mounted on said drive shaft, a plurality of relatively fixed cone gears secured to said sleeve, a feed shaft journaled on said frame, a plurality of gears fixed to said feed shaft, and means for connecting any one of said cone gears with any one of the gears on said feed shaft.

7. In a grain drill, a frame, a drive shaft journaled thereon, a feed shaft journaled thereon, a plurality of spaced apart relatively fixed cone gears slidably carried by said drive shaft, a plurality of gears fixed to said feed shaft, a swinging bracket carried by said feed shaft, and means carried by said bracket for connecting any one of said cone gears with any one of the gears carried by said feed shaft.

8. In a grain drill, a frame, a drive shaft journaled thereon, a feed shaft journaled thereon, a plurality of relatively fixed cone gears carried by said drive shaft, a plurality of gears on said feed shaft, a swinging bracket carried by said feed shaft, and idler gears adjustably carried by said bracket for connecting said cone gears to the gearing on said feed shaft.

9. In a grain drill, a drive shaft, a feed shaft, a plurality of gears carried by said drive shaft, a plurality of gears carried by said feed shaft, a swinging bracket carried by said feed shaft, and a plurality of idler gears carried on said bracket for connecting the gears on said drive shaft to the gears on said feed shaft, and means carried by one of the gears for preventing relative lateral displacement when said gear is in mesh with the gears on said drive shaft.

10. In a grain drill, a drive shaft, a feed shaft, a plurality of gears carried by said drive shaft, and idler gears for connecting said drive shaft to said feed shaft adapted to mesh with the gears on said drive shaft, one of said idler gears being provided with flanges for preventing lateral displacement of said gear when the same is in mesh with one of the gears on the drive shaft.

11. In a grain drill, a frame, a drive shaft carried thereon, a driven shaft carried thereon, and adjustable speed varying driving connections between said drive shaft and said driven shaft including a bracket pivoted on said frame, a flanged idler gear adjustably carried by said bracket, and means for securing said bracket to said frame in varied positions of adjustment.

12. In a grain drill, a frame, a drive shaft journaled thereon, a driven shaft journaled thereon, a series of cone gears carried by said drive shaft, a series of gears carried by said driven shaft, means for connecting the gears on said drive shaft to the gears on said driven shaft, said connecting means having means for preventing relative lateral displacement between said connecting means and said cone gears.

13. In a grain drill, a drive shaft, a driven shaft, adjustable speed varying driving connections therebetween, including relatively fixed cone gears carried by said drive shaft, and means for operatively connecting one of said cone gears to said driven shaft, said connecting means having means for preventing lateral displacement between said connecting means and the cone gear with which it is operatively connected.

CHARLES W. ROBINSON.

Witnesses:
JOHN H. C. THOMPSON,
JAMES CLENDENNING.

Copies of this patent may be obtained for five cents each, by addressing the "Commissioner of Patents, Washington, D. C."